US007897081B2

(12) United States Patent
Ausen et al.

(10) Patent No.: US 7,897,081 B2
(45) Date of Patent: Mar. 1, 2011

(54) METHOD OF EXTRUDING ARTICLES

(75) Inventors: Ronald W. Ausen, St. Paul, MN (US);
Jayshree Seth, Woodbury, MN (US);
Janet A. Venne, Roseville, MN (US)

(73) Assignee: 3M Innovative Properties Company,
Saint Paul, MN (US)

( * ) Notice: Subject to any disclaimer, the term of this patent is extended or adjusted under 35 U.S.C. 154(b) by 970 days.

(21) Appl. No.: 11/151,969

(22) Filed: Jun. 14, 2005

(65) Prior Publication Data

US 2006/0147686 A1 Jul. 6, 2006

Related U.S. Application Data

(63) Continuation-in-part of application No. 11/026,188, filed on Dec. 30, 2004, now abandoned.

(51) Int. Cl.
*A21C 3/10* (2006.01)
*B29C 47/06* (2006.01)

(52) U.S. Cl. .................. 264/173.16; 264/515; 264/514; 425/313

(58) Field of Classification Search ............. 425/131.1, 425/133.5, 462, 110, 113; 264/171.1, 464–477, 264/514–515, 173.16
See application file for complete search history.

(56) References Cited

U.S. PATENT DOCUMENTS

| | | | |
|---|---|---|---|
| 3,387,069 A | 6/1968 | Stohr | |
| 3,397,428 A | 8/1968 | Donald | |
| 3,398,431 A | 8/1968 | Corbett | |
| 3,448,183 A | 6/1969 | Chisholm | |
| 3,485,912 A | 12/1969 | Schrenk et al. | |
| 3,594,870 A | 7/1971 | Schippers et al. | |
| 3,756,758 A | 9/1973 | Prall | |
| 3,807,918 A * | 4/1974 | Chill et al. | 425/133.5 |
| 3,890,083 A * | 6/1975 | St. Eve | 425/462 |
| 3,920,365 A | 11/1975 | Mules | |
| 3,932,090 A | 1/1976 | Brumlik | |
| 4,001,366 A | 1/1977 | Brumlik | |
| 4,083,914 A | 4/1978 | Schippers et al. | |
| 4,189,809 A | 2/1980 | Sotos | |
| 4,197,069 A | 4/1980 | Cloeren | |

(Continued)

FOREIGN PATENT DOCUMENTS

CN 101094757 12/2007

(Continued)

*Primary Examiner*—Matthew J. Daniels
*Assistant Examiner*—Jodi Cohen
(74) *Attorney, Agent, or Firm*—Kathleen B. Gross; Lynn R. Hunsberger; William J. Bond

(57) ABSTRACT

Methods for coextruding a predetermined initial melt stream through at least one profiled die having a nonlinear inlet opening and an outlet opening. The die insert is positioned so as to cause redistribution of at least a portion of the melt stream. The nonlinear melt stream formed at the nonlinear inlet opening converges within the die insert into a substantially more linear or rectangular melt stream at the die insert outlet opening. At the die insert outlet opening at least one or more regions of the melt stream vary in properties or material clue to the redistribution of the melt stream in the die insert. Articles extruded using the coextrusion methods are also described.

51 Claims, 16 Drawing Sheets

U.S. PATENT DOCUMENTS

| | | |
|---|---|---|
| 4,285,100 A | 8/1981 | Schwarz |
| 4,368,565 A | 1/1983 | Schwarz |
| 4,426,344 A * | 1/1984 | Dinter et al. ............ 264/173.15 |
| 4,435,141 A * | 3/1984 | Weisner et al. ............ 425/131.1 |
| 4,492,549 A | 1/1985 | Rasmussen et al. |
| 4,533,510 A | 8/1985 | Nissel |
| 4,536,362 A | 8/1985 | Donaldson |
| 4,551,369 A * | 11/1985 | Belz .......................... 428/35.2 |
| 4,636,419 A | 1/1987 | Madsen et al. |
| 4,720,252 A | 1/1988 | Appel et al. |
| 4,732,723 A | 3/1988 | Madsen et al. |
| 4,755,247 A | 7/1988 | Mudge |
| 4,787,897 A | 11/1988 | Torimae et al. |
| 4,806,289 A * | 2/1989 | Laursen et al. .............. 264/1.29 |
| 4,839,131 A | 6/1989 | Cloeren |
| 4,842,794 A | 6/1989 | Hovis et al. |
| 4,871,487 A * | 10/1989 | Laursen et al. .............. 264/1.29 |
| 4,882,185 A * | 11/1989 | Simelunas et al. ........... 426/283 |
| 5,045,264 A | 9/1991 | Kirksey |
| 5,078,942 A * | 1/1992 | Sullivan et al. ........ 264/171.27 |
| 5,120,484 A | 6/1992 | Cloeren |
| 5,162,074 A * | 11/1992 | Hills ........................... 216/83 |
| 5,173,141 A | 12/1992 | Leseman et al. |
| 5,209,282 A | 5/1993 | Franco et al. |
| 5,223,276 A | 6/1993 | Djordjevic et al. |
| 5,256,052 A * | 10/1993 | Cloeren ................... 425/133.5 |
| 5,298,310 A | 3/1994 | Havens |
| 5,344,691 A | 9/1994 | Hanschen et al. |
| 5,354,597 A | 10/1994 | Capik et al. |
| 5,383,616 A | 1/1995 | Svaighert |
| 5,429,856 A * | 7/1995 | Krueger et al. .............. 604/370 |
| 5,462,708 A | 10/1995 | Swenson et al. |
| 5,468,428 A | 11/1995 | Hanschen et al. |
| 5,501,675 A | 3/1996 | Erskine |
| 5,686,128 A * | 11/1997 | Tracy et al. ................. 426/284 |
| 5,840,412 A | 11/1998 | Wood et al. |
| 5,879,602 A * | 3/1999 | Scheuring ................... 264/136 |
| 5,891,549 A | 4/1999 | Beretta et al. |
| 5,976,665 A | 11/1999 | Hansson |
| 6,221,483 B1 | 4/2001 | Hilston et al. |
| 6,245,401 B1 | 6/2001 | Ying et al. |
| 6,398,535 B1 * | 6/2002 | Cloeren ................... 425/131.1 |
| 6,413,595 B1 * | 7/2002 | Schirmer ............... 264/171.27 |
| 6,511,742 B1 | 1/2003 | Mussig et al. |
| 6,565,347 B1 * | 5/2003 | Linkies et al. ............. 425/190 |
| 6,669,887 B2 | 12/2003 | Hilston et al. |
| 6,767,492 B2 * | 7/2004 | Norquist et al. ........ 264/173.15 |
| 6,837,698 B2 * | 1/2005 | Floyd et al. .............. 425/131.1 |
| 7,048,984 B2 | 5/2006 | Seth et al. |
| 7,182,992 B2 | 2/2007 | Ausen et al. |
| 7,241,483 B2 | 7/2007 | Ausen et al. |
| 7,678,316 B2 | 3/2010 | Ausen et al. |
| 2002/0127293 A1* | 9/2002 | Bentley et al. ............. 425/72.2 |
| 2002/0179007 A1* | 12/2002 | Burkett et al. ............... 118/125 |
| 2002/0195738 A1* | 12/2002 | Norquist et al. ........ 264/173.16 |
| 2003/0203155 A1 | 10/2003 | Kobe et al. |
| 2005/0003151 A1 | 1/2005 | Jacoby |
| 2005/0060849 A1 | 3/2005 | Vanbenschoten et al. |
| 2006/0147686 A1* | 7/2006 | Ausen et al. ................. 428/212 |
| 2007/0154683 A1* | 7/2007 | Ausen et al. ................. 428/172 |

FOREIGN PATENT DOCUMENTS

| | | |
|---|---|---|
| DE | 295 14 350 | 11/1995 |
| DE | 201 04 988 | 10/2001 |
| EP | 0 160 857 A2 | 11/1985 |
| EP | 0 353 064 B1 | 1/1990 |
| JP | 6-293067 | 10/1994 |
| JP | 8-187113 | 7/1996 |
| WO | WO 2005/123363 A1 | 12/2005 |
| WO | WO 2006/073774 A2 | 7/2006 |

* cited by examiner

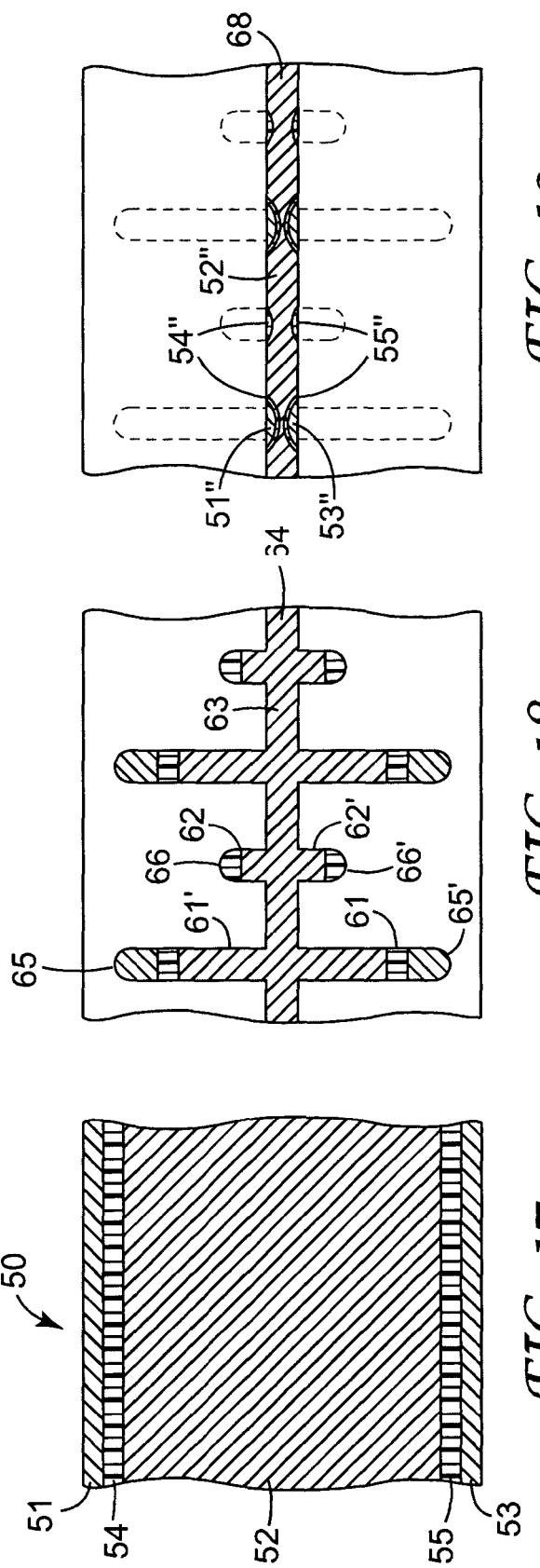

METHOD OF EXTRUDING ARTICLES

CROSS REFERENCE TO RELATED APPLICATIONS

This application is a continuation-in-part of U.S. patent application Ser. No. 11/026,188, filed Dec. 30, 2004 now abandoned.

BACKGROUND OF THE INVENTION

Coextrusion of multiple polymeric components into a single layer cast film is relatively common in the art. Often, multiple polymeric flow streams are combined in a die or feedblock in a layered fashion to provide a top to bottom multilayer film. The diverse polymer flowstreams are typically combined in a feedblock section or the like and then flow in a layered configuration into a conventional coat hanger die arrangement, where the flowstreams flatten out into a film-like flowstream and are extruded onto a casting roll or the like. This arrangement creates films where the polymers form into layers in the thickness dimension.

Alternatively, it is also proposed to provide more complicated coextruded film structures where the layers are partitioned not as coextensive layers in the thickness direction but partitioned along the width of the film. An example is where the polymers are partitioned in a side-by-side configuration or variations thereof to provide discrete included zones of a first polymer within a continuous matrix of a second polymer. U.S. Pat. No. 4,426,344 describes a complicated feedblock method which takes two coextruded melt streams initially arranged in the thickness direction, with a zig-zag interface, and redirects the top to bottom layered polymer flows into a side-by-side arrangement resulting in a film having a sinusoidal or zig-zag interface, with different zones in the width direction. Although the two halves were indicated as being formed of identical materials it is conceivable that different materials could be employed in the two halves though this is not specifically taught.

Japanese Kokai No. 8-187113 discloses the possibility of side-by-side coextrusion although a specific method for achieving this is not specifically disclosed. U.S. Pat. No. 6,221,483 also discloses a side-by-side coextrusion of an elastic material and an inelastic material for use in a diaper fastening tab. The elastic materials are intermittently spaced by inelastic material. The side-by-side arrangement is achieved by using an insert in a conventional two layer slot die which blocks off alternating lanes of the elastic and inelastic materials coming from the two slots and brings them together in an alternating fashion. The two materials would still tend to flow laterally in the die once they pass the insert. U.S. Pat. No. 4,787,897 also discloses a side-by-side arrangement of multiple layers, although in this case three zones are disclosed. There are two outer inelastic zones with a single inner elastic zone. The inner elastic zone is created somehow by coalescence of a single elastic melt stream in a die, but it is unclear how this is done. U.S. Pat. No. 5,429,856 discloses the possibility of creating discrete elastic strands or zones within an inelastic matrix by an inclusion coextrusion technique using a Cloeren-type three layer die feeding discrete strands of elastic into the center melt stream with two inelastic outer layers sandwiching the discrete elastic flowstreams.

All the above described methods describe methods for forming films. Anything other than simple multiple layers in the thickness dimension such as side-by-side layering or more complex layer arrangements, are created by modifications of either of the feedblock or the die wherein polymer melt flows are diverted or redirected or the like. These approaches are somewhat problematic in an enclosed die or feedblock. They require that melt streams of different polymeric materials be exposed to complex nonlinear flow patterns within the body of the die or manifold. This can result in complex flow interactions and problems with residue build up and the need for routine disassembling and cleaning at the die and/or feedblock. Also different materials do not generally combine in a predictable manner as the flow characteristics of the polymers in the die or manifold are not always the same. When the materials are combined, complex flow interactions occur between the convergence zones for the polymers and the extruder die lip resulting in films other than those specifically desired. The present invention addresses some of these problems by providing for side-by-side type relative layering in extruded films by altering the discrete thermoplastic resin streams in a film extrudate immediately at the die lip, in the die, or before the die.

BRIEF DESCRIPTION OF THE INVENTION

The present invention method generally includes coextruding a predetermined initial melt stream through at least one profiled die, or feedblock, insert, or component, which insert inlet is shaped to form a nonlinear melt stream from the incoming initial melt stream. The insert inlet has a nonlinear opening where the insert opening structure is located between an upper boundary to a lower boundary. The insert is positioned so as to redirect the flow of one or more of the melt streams or regions of the incoming melt stream. The initial melt stream at the insert inlet is generally redirected in the cross direction to the original flowpath of the material melt stream. The nonlinear melt stream formed at the insert inlet then converges within the insert into a substantially more linear or rectangular melt flow stream at the insert outlet opening. At the insert outlet opening at least one layer or portion of the initial melt stream has been partitioned, into different proportions in different zones in the width or cross direction of the extruded material or film. The invention is also directed at articles extruded using the methods described.

The present invention is also directed at a coextruded polymer film with varying polymer zones in the width or cross direction, preferably formed from a multilayer or multicomponent melt stream. The extruded polymer film has a first face and a second face. The polymer(s) forming the film is coextruded from a conventional multilayer or multi-component die and then the flow is partitioned at the die face or within the die or the feedblock by a profiled insert having a profiled opening between an upper boundary to a lower boundary on either side of a center line. The film is characterized by two or more side-by-side zones with different polymers or relative proportions of polymers.

BRIEF DESCRIPTION OF THE DRAWINGS

The present invention will be further described with reference to the accompanying drawings wherein like reference numerals refer to like parts in the several views, and wherein:

FIG. 17 is a cross-sectional view of the third precursor melt stream, which can be used in accordance with the invention method.

FIG. 18 is a cross-sectional view of the FIG. 17 melt stream at a fourth embodiment die insert inlet.

FIG. 19 is cross-sectional view of the FIG. 17 melt stream at the die insert outlet of FIG. 18.

DETAILED DESCRIPTION OF THE PREFERRED EMBODIMENT

Figure 1:
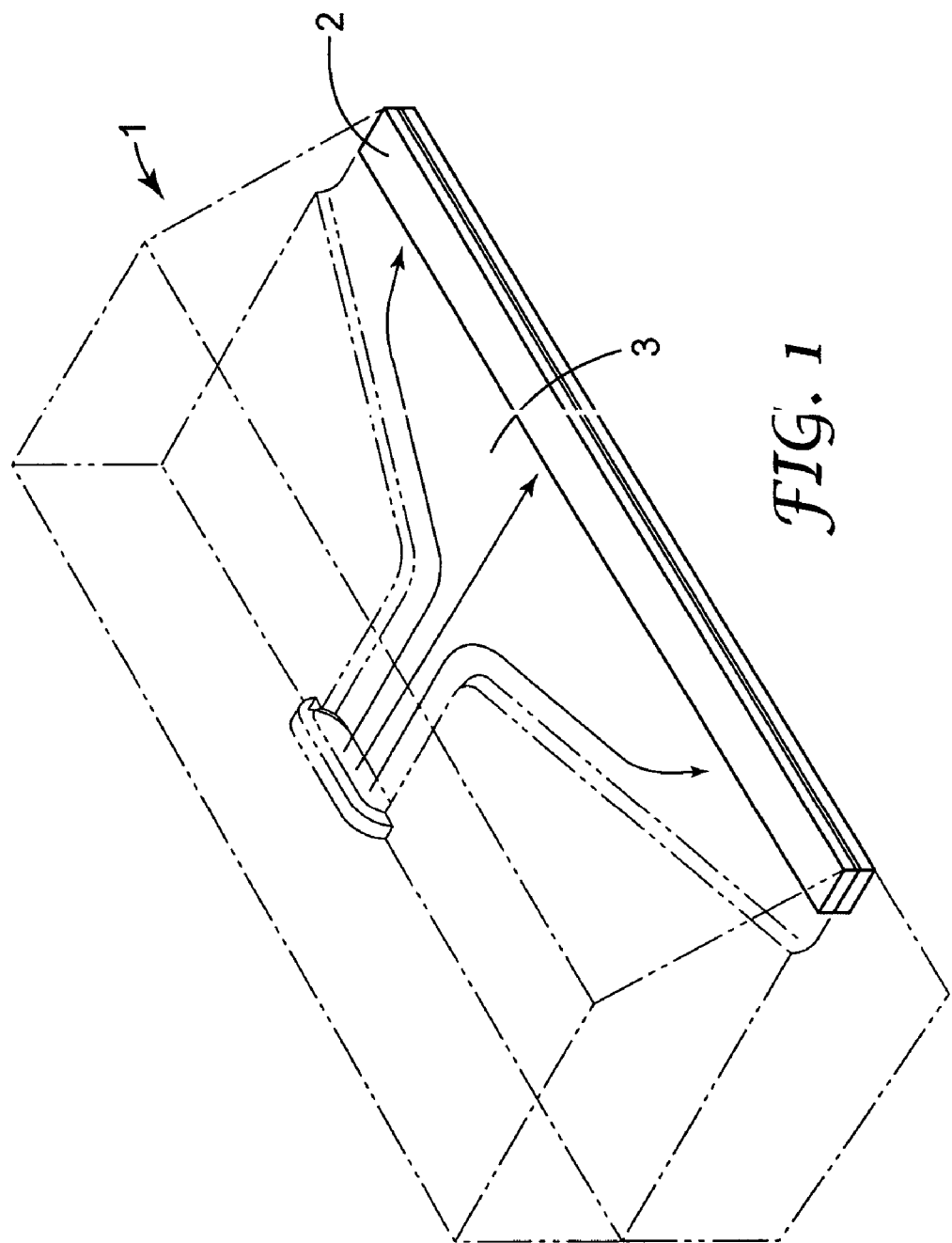
FIG. 1 is a cutaway perspective view of a die having a die insert such as used in the invention.
Figure 6:
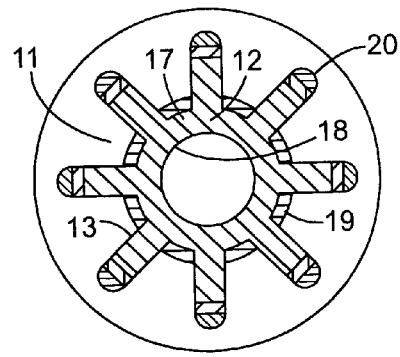
FIG. 6 is a cross sectional view of the precursor melt stream of FIG. 4 at a circular die insert inlet similar to that of FIGS. 2 and 3.

A die used in a method for forming an extruded film or article of the invention is schematically illustrated in FIG. 1. Generally, the method includes first extruding an initial melt stream along a predetermined flowpath, which can be a multilayer or multi-component melt stream 3 through a die insert 2, such as the die insert shown in FIGS. 2 and 3. The predetermined flowpath is preferably one dimensional and continuous along some portion of the flowpath. By one dimensional it is meant that the melt stream could be any one dimensional linear type shape such as a straight line, but it could be a curved line, which curve could intersect itself and form an oval or round form, as shown in FIG. 6. As shown in FIG. 1, the melt stream is delivered from conventional extruders (not shown) through the die 1 having at least one die insert 2, where the die insert has a front face to which the large arrow is pointing in FIG. 2, which front face has a profiled non-rectilinear inlet opening. By non-rectilinear it is meant that the die insert inlet opening as a whole is in a form other than a rectangular shape, however portions of the die inlet openings could be rectilinear in form. The die insert inlet opening interrupts at least portions of the incoming initial melt stream and redirects portions of the interrupted melt stream from the predetermined initial melt stream flowpath form to a flowpath or flowpaths form defined by the die insert inlet opening. The interrupted and redirected melt stream is then converged in the die insert to a generally converging flowpath, defined by the die insert from the profiled shape at the die insert inlet opening to the die insert outlet opening. The outlet opening is in a back face opposite the front face of the insert. The back face is the face away from which the large arrow points in FIG. 3. In the insert illustrated in FIGS. 2 and 3, the front face and the opposing back face are parallel. The converged melt stream flowpath at the die insert outlet can be similar to the original predetermined initial melt stream flowpath. The die insert used for this method causes a redistribution of the initial melt flow stream, at least in part in the cross direction. This also causes at least one layer of the melt stream to redistribute into a multiple of unique possible flowpaths, which generally results in the flow in these flowpaths to have differing flowrates, and hence different levels of melt induced orientation, either in the cross direction of the die insert or in the thickness dimension of the die insert at the die insert outlet or both dimensions. The melt stream at the die insert outlet is then extruded as an article, such as a film or the like, or extruded to a further processing step within the die if the die insert is located within the die. By melt stream it is meant a stream of a Newtonian or viscoelastic fluid capable of being extruded and solidified at the exit of a die. The material may or may not be in a melt phase.

The insert is shown in the embodiment discussed above as a separate element located within the die. The insert could also be formed integral with the die and/or feedblock in which it is located as long as it has the features described. The term insert is used to identify any structure providing a profiled inlet and other features as described, regardless if in a die, feedblock, or another component.

A multilayer or multi-component melt stream can be formed by any conventional method. A multilayer melt stream can be side-by-side or coextensive layers and be formed by a multilayer feedblock, such as that shown in U.S. Pat. No. 4,839,131. A multicomponent melt stream can have domains or regions with different components such as could be formed by use of inclusion co-extrusion or other known methods, such as that shown in U.S. Pat. No. 6,767,492. A coextruded melt stream can have a structured arrangement, such as a conventional horizontally layered multilayered flow stream, or be substantially non-structured or random. It is also possible to extrude homogeneous melt flow streams by the method of the present invention. The major substantial effects in this case would be directionally spaced zones at the insert outlet having more or less melt induced orientation due to redistribution of portions of the initial flow stream in the insert.

The melt stream is redirected or redistributed at the insert inlet and within the insert by the insert profile converging from its initial nonlinear or non-rectilinear flowpath form (cross sectional shape of the flowpath or die cavity at a given point) to a substantially more linear or rectilinear flowpath form and/or a flowpath form that can resemble the initial predetermined material(s) flowpath form. The material(s) forming one or more layers or regions of the precursor melt stream are redistributed or redirected in a direction, which can be in the cross direction and/or other dimensions relative to the initial predetermined material flowpaths or forms. The redirected flow is caused at least in part by disruption or interruption of a portion of the material flow at the insert inlet. The disrupted melt stream converges along a flowpath within the insert into a less structured form, which can be similar to the original material flowpath form, e.g. a rectangular insert opening or the like, where at least a part of one layer or portions of the initial melt stream has been partitioned into different proportions in different zones such as in the width or cross direction of the extruded material or film emerging from the die insert outlet opening. This process can be repeated using multiple inserts separated within a die or feedblock. Where the process is performed closer to the feedblock, or in the feedblock, the polymer melt stream flowpath form will be less elongated into a film like structure and will have a higher ratio of height to width. This will result in relatively larger zones of the polymer melt being redistributed by the insert. Where the insert is closer to the die outlet the incoming polymer melt stream flowpath form will be more elongated into a filmlike form having a smaller ratio of height to width. An insert at this point would redistribute smaller portions of the incoming polymer melt flow stream. These two types of inserts can be combined to permit both large scale and smaller scale polymer redistribution on the same melt stream.

Figure 2:
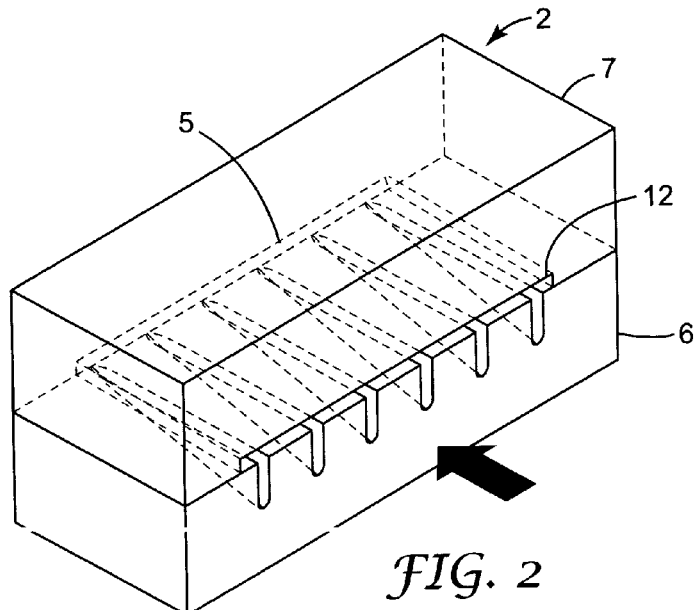
FIG. 2 is a perspective view of a die insert used to form a film in accordance with the present invention viewed from the die insert inlet.
Figure 3:
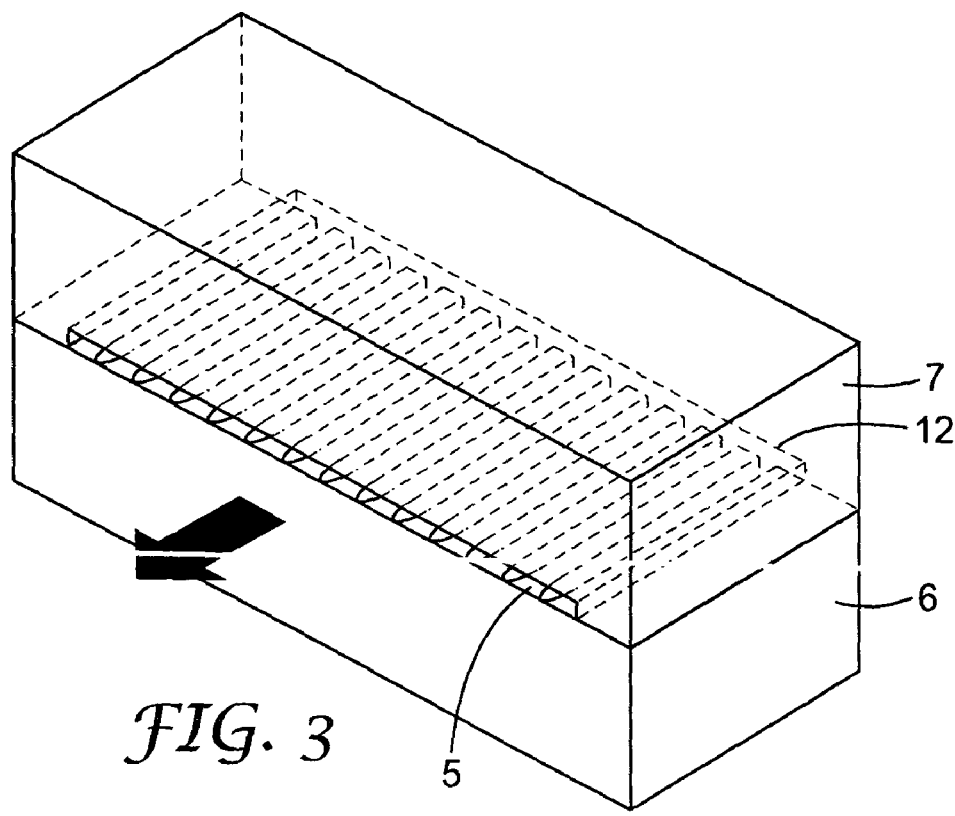
FIG. 3 is a perspective view of a die insert used to form a film in accordance with the present invention viewed from the die insert outlet.

The invention insert can be easily fitted into a conventional die such as a coat hanger die as shown in FIG. 1 and can be readily removed, replaced and cleaned if the die insert is formed of multiple disassemblable components, such as first and second halves 6, 7 as shown in FIGS. 2 and 3. This die insert can be easily taken apart and cleaned for maintenance and reassembled. Using multiple die components to form a die insert also allows for more complex flowpaths to be formed by conventional methods such as electron discharge wire machining. Although a two-piece die insert is shown, multiple piece die inserts are also possible allowing for more complex flow channels or flowpaths to be formed in the assembled die insert. The die insert could also be formed in whole or in part with other parts of the die. The flowpaths within the die insert however are preferably substantially continuous and converging, such that they, in at least part of the flowpath within the die, taper in a linear fashion.

Figure 5:
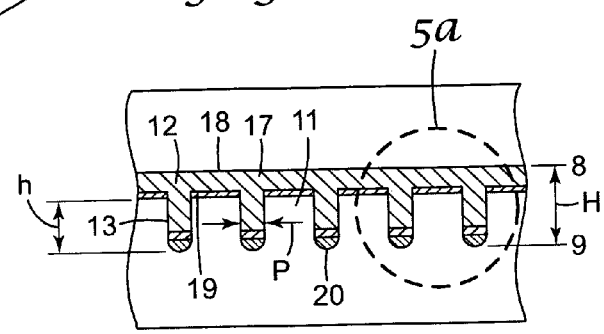
FIG. 5 is a cross-sectional view of the precursor melt stream of FIG. 4 at the die insert inlet of the FIGS. 2 and 3 die insert.
Figure 5A:
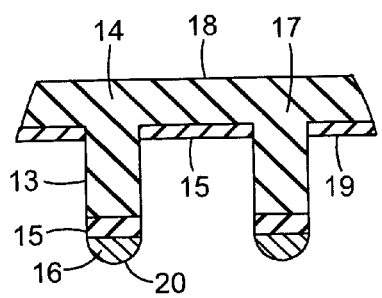
FIG. 5a is an exploded cross-sectional view of FIG. 5.
Figure 41:
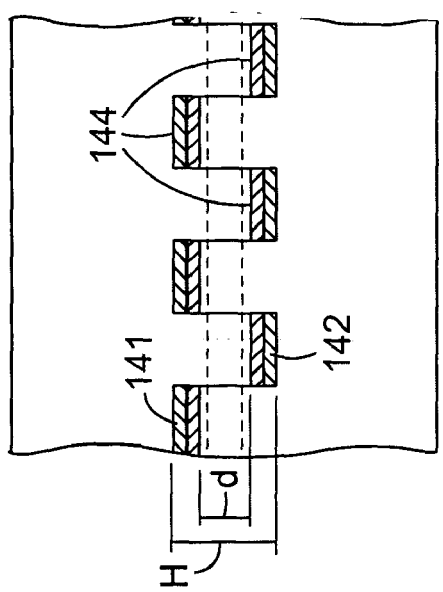
FIG. 41 is a cross-sectional view of the FIG. 40 melt stream at an eleventh embodiment die insert inlet.

The insert inlet region, as shown in FIG. 5, is characterized by having a two dimensional nonplanar structure which is bounded by a top boundary 8 and a bottom boundary 9. Within the inlet region defined by the top boundary 8 and bottom boundary 9, as shown in FIGS. 5 and 6, there are open areas of the insert inlet 12, forming the insert opening, separated by closed areas 11. There are also closed areas in the front face of the insert above the upper boundary 8 and below the lower boundary 9. The closed areas above the upper boundary 8, below the lower boundary 9, and in the region between the upper boundary 8 and the lower boundary 9 surround the inlet opening. The open areas are characterized by structures 13 having width dimensions "P", which dimension "P" of course can vary along the open area structure, as can all dimensions. These structures 13 can be substantially continuous openings, branched openings and/or intermittent openings (such as is shown in FIG. 41). The open areas, of at least a portion of an inlet region, generally constitute between 10 to 90 percent of the total area defined between the top and bottom boundaries 8 and 9 in at least a portion of the insert inlet (where the top and bottom boundaries are taken as those bounding the structures in that region of the die insert inlet), or alternatively 20 to 80 percent. Inversely the closed areas account for 90 to 10 percent of the die insert inlet or alternatively 80 to 20 percent, or greater than 10, 20 or 30 percent up to greater than 50 percent. With greater levels of closed areas in an insert inlet larger proportions of material in the initial material flowpath are forced to find alternative flowpaths in order to enter the insert inlet opening. Generally, the initial material flowpath cross sectional area can be as large or larger than the insert inlet region but could be less than the insert inlet region.

The insert inlet opening (or portions thereof) can also be characterized by the ratio of the perimeter of a section of the insert inlet opening to an equivalent rectangular die insert opening (an opening having the same width and same average width dimension P). The ratio of the perimeter of the invention insert inlet opening to the perimeter of an equivalent rectangular insert inlet opening is the perimeter ratio, which can be between 1.1 and 10 or greater than 1.1 or 1.5 or 2.3 but generally less than 8 or 5. Structures with larger perimeters or perimeter ratios are considered more highly structured openings. With more highly structured openings there is generally a more dramatic redistribution of the melt flow from the incoming initial melt flow stream, such as a multilayer or multicomponent flow stream. This is generally due to more possible alternative flowpaths for a given interrupted flowpath. However, with a very large perimeter ratio with a relatively low level of closed areas not much of the melt is significantly redistributed. More closed areas (lower percent open area) leads to more dramatic redistribution of at least some portion of the incoming melt flow stream, particularly when coupled with more highly structured continuous openings or discontinuous openings.

Figure 28:
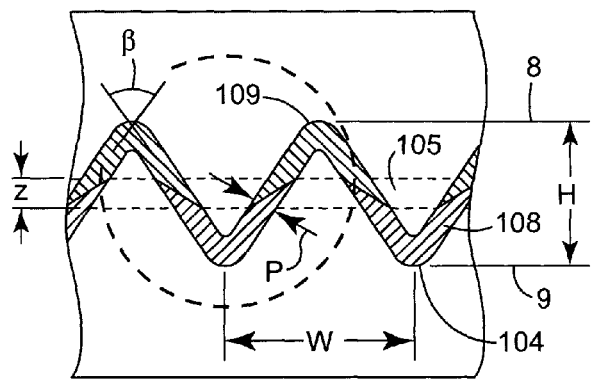
FIG. 28 is a cross-sectional view of a two-layer melt stream at the inlet of the die insert of FIG. 26.
Figure 29:
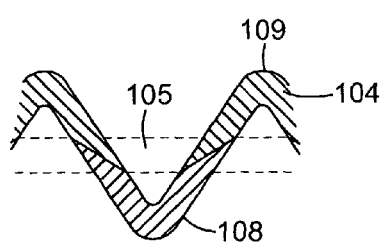
FIG. 29 is an exploded cross-sectional view of FIG. 28.
Figure 27:
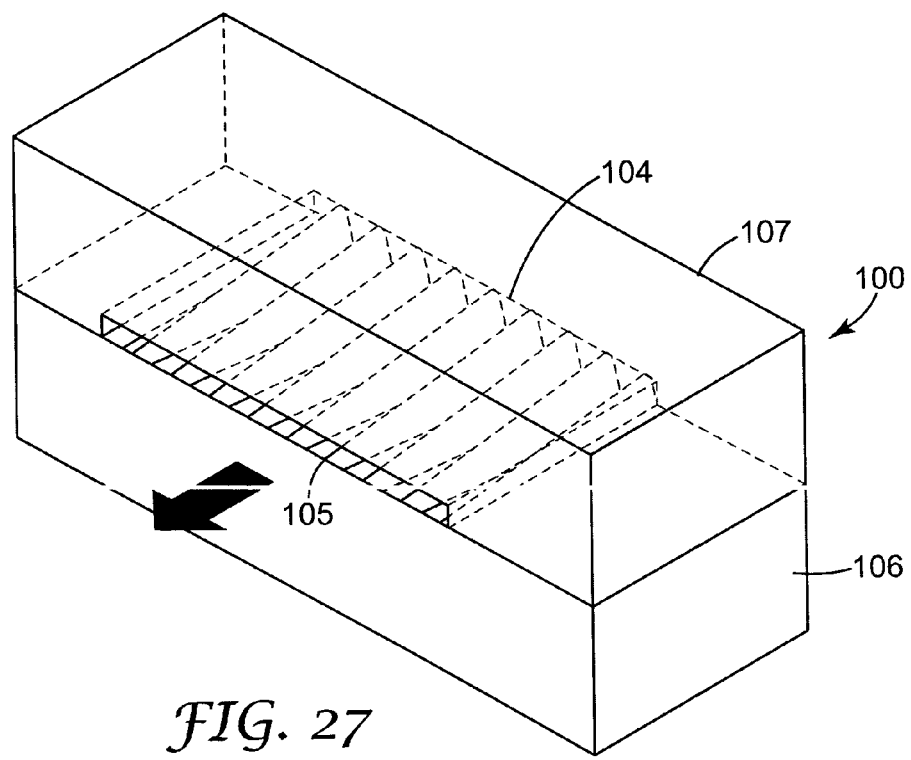
FIG. 27 is a perspective view of the die insert of FIG. 26 viewed from the die insert outlet.

Generally some material at given points in the melt flow stream is forced to find alternative flow paths due to the closed areas 11 as shown in FIG. 5. With a highly structured opening there are a larger variety of unique possible flow paths in the region bounded by the two boundaries 8 and 9. A unique flow path is a region defined by the thickness dimension P as shown in FIGS. 5 and 28 and its deviation from a standardized flow path defined by the equivalent rectilinear flow path. Material is more easily diverted when there are a large number of possible flow paths that deviate from a mean flow path. For a given insert opening this is defined as the flow path deviation factor (defined in the Examples below) for the opening or section of the opening. Generally this deviation factor is greater than 0.2, or greater than 0.5, up to 2 or 3, however higher deviation factors are possible. With a higher deviation factor there are more possible flow paths that are spaced apart in between the top boundary 8 and the bottom boundary 9. The outlet of the die insert can also have a deviation factor but preferably much less than the corresponding inlet. Generally the outlet has a deviation factor at least 50 percent less, or 80 percent less than the inlet. The outlet can have a deviation factor of zero to provide the greatest amount of flow redistribution and create a flat profiled film or melt stream.

Generally, the insert inlet opening is characterized by having elements (e.g., 13) on a given region of the die insert extending between at least a portion of the top boundary 8 to bottom boundary 9 for that region. These elements have a height "h" which can be less than the distance "H" between the top and bottom boundaries and are generally 10 to 100 percent of "H" or 20 to 90 percent of "H". The elements can extend at an angle from 2 to 90 degrees or 5 to 80 degrees, or 10 to 90 degrees from the mean flowpath extending between the top to bottom boundaries. The elements generally have an aspect ratio of height "h" to height "H" of greater than 10 percent or possibly greater than 25 percent. Smaller aspect ratio structures are possible but lead to less dramatic redistribution of flow.

Figure 26:
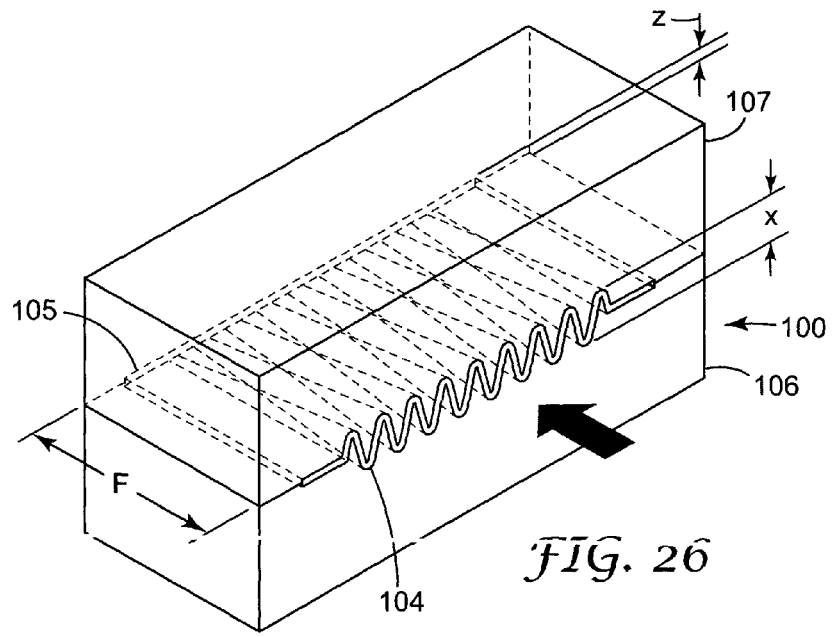
FIG. 26 is a perspective view of a seventh embodiment die insert in accordance with the present invention viewed from the die insert inlet.

With oscillating inlet openings such as shown in FIGS. 26 and 28, the elements would constitute a leg 108 between an upper peak 109 and an adjacent lower peak 104 having a height "H". An individual element may extend from the top boundary to the bottom boundary or be an extension of another opening somewhere between the top and bottom boundaries.

Generally, the insert from the inlet opening tapers substantially continuously to the insert outlet opening. Alternative tapering channels within the insert are also possible, such as channels that taper outwardly for some portions of its flowpath or tapers in step function changes between the die insert inlet and outlet openings.

Figure 7:
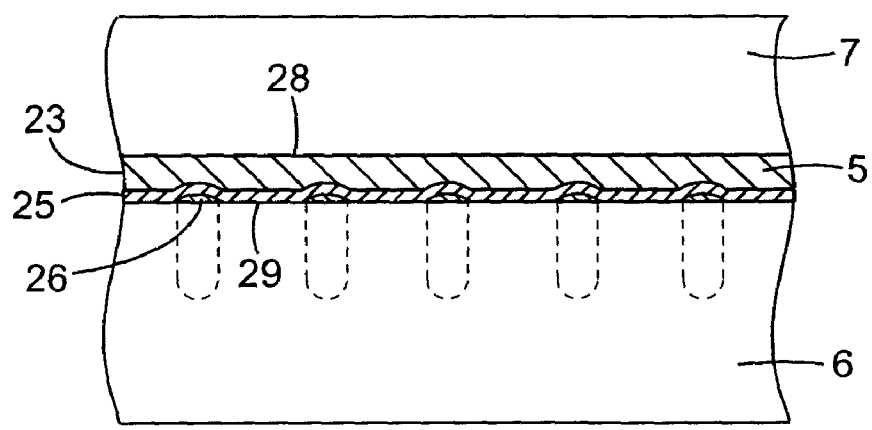
FIG. 7 is a cross-sectional view of the precursor melt stream of FIG. 5 at the die insert outlet.

The open area of the insert inlet opening is generally greater than the open area of the insert outlet opening. The outlet opening extends a distance between an outlet opening upper boundary and an outlet opening lower boundary as shown in FIG. 7. The distance between the inlet opening upper boundary and inlet opening lower boundary is larger than the distance between the outlet opening upper boundary and the outlet opening lower boundary as illustrated by the dotted lines. The ratio of the inlet to outlet opening can be from 0.9 to 10 or 1 to 5. Although it is possible for the inlet area to be less than that of the outlet this would create more back pressure and thicker film structures.

Figure 4:
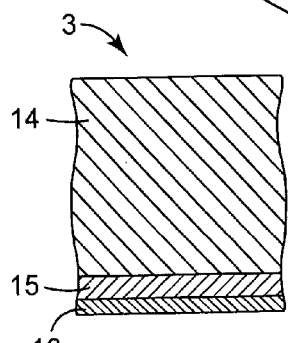
FIG. 4 is a cross-sectional view of a possible precursor multilayer melt stream used in accordance with the present invention method.

FIG. 4 shows a cross-sectional view of a precursor melt stream which could be fed into the inlet opening of an insert. The FIG. 4 three layer melt stream is characterized by a relatively thick layer 14 with two thinner layers 15 and 16 on one face of the thicker layer 14. When this melt stream intercepts with the insert inlet opening 12, the thicker layer 14 is partitioned primarily into the continuous channel 17 of the inlet opening 12 adjacent the top boundary, which could form a substantially continuous film backing. A portion of the melt stream thicker layer 14 also gets distributed into the elements 13. The portion of the melt stream 14 that goes into elements 13 would depend on the relative thickness of the melt stream 14 in relationship to the height of the elements 13 and the size of the insert inlet opening 12 channel 17. The outermost melt stream layer 16 will tend to redistribute into the tips of the elements 13 with little or no material of this layer being found on the outer surface 19 of the continuous die insert inlet channel 17. As shown in FIG. 5 the middle layer 15 will tend to disproportionally partition into the upstanding elements 13. A portion of the melt stream 15 can partition to the surface 19 of the continuous channel 17 depending on the spacing of the main opening and the elements 13 relative to the flow stream. With an insert inlet design, such as shown in FIG. 5, the tips 20 of the elements 13 are displaced a significant distance from main flow channel 17 of the insert inlet 12, which results in a disproportionate allocation of the outermost portion of the melt flow into the elements 13, in this case layer 16. The layer 16 generally will follow the shortest flowpath to an inlet opening, which for the outermost layer 16 would generally be the tips 20 of the elements 13 rather than the main flow channel 17. Generally, with any given portion of the material flow, the material will tend to flow to the closest opening provided by the inlet 12. With the intermediate layer 15, a portion of the material flow will distribute to the main flow channel 17 as the flowpath to this flow channel is somewhat shorter for intermediate layer 15 than that for the outermost layer 16. At the insert outlet opening 5, as shown in FIG. 7, the three material melt stream layers are in recombined form. The outermost layer 16 has been redistributed into discrete regions 26 on the outer surface of the extrudate while the middle layer 15 now forms the outermost layer in region 29. The thick layer 14 forms layer 23 at the outlet forming an outer surface 28. The result is structuring of the two thin layers into side-by-side regions 29 and 26. If the extrudate at this point is extruded as a final film, the regions 29 and 26 will likely be nonplanar due to flow variations. The regions 26 will have higher relative flow and tend to form continuous ridges upon exiting the die. This can be advantageous in providing differential structural properties on a single structure face, such as a film face.

Figure 8:
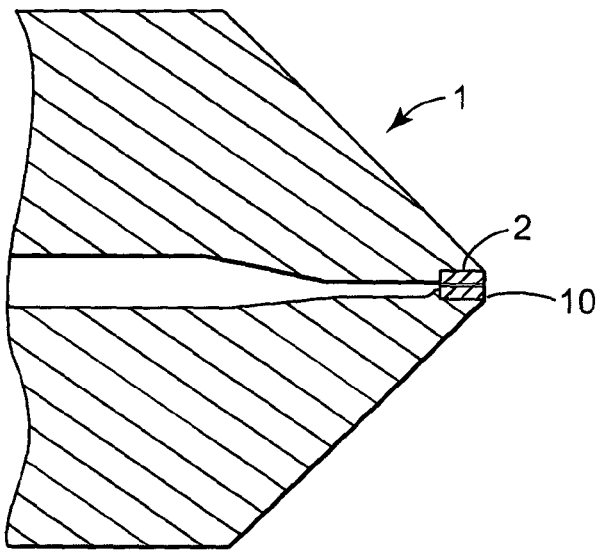
FIG. 8 is a side view of a first embodiment die using the die insert of the invention for directly extruding a film.
Figure 9:
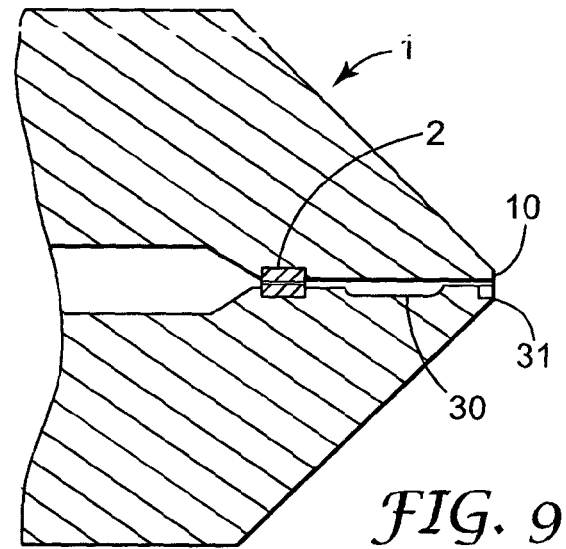
FIG. 9 is a alternative embodiment using a die insert of the invention in combination with a conventional die insert.
Figure 10:
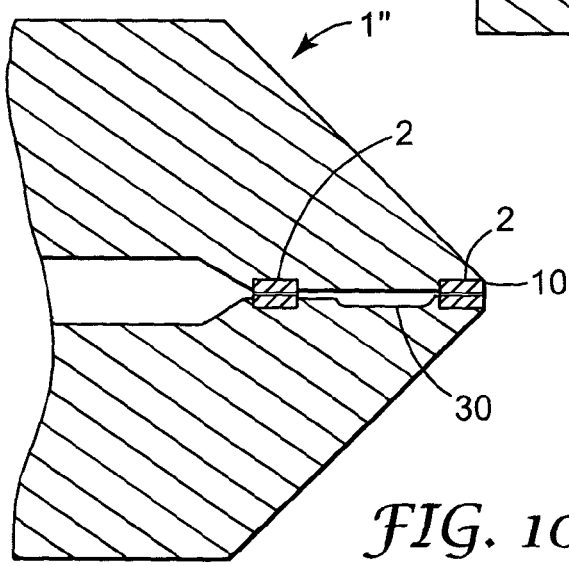
FIG. 10 is a side view of two die inserts of the invention used in series.

As shown in FIG. 8, an insert can be placed at the outermost tip 10 of the die 1. In this case, the die insert outlet forms the final article exiting the die. An alternative construction, as shown in FIG. 9, is a die insert of the invention that is located inward from a conventional die tip 31. With this arrangement flow irregularities created by the profiled die insert can be mitigated by a flow regulating chamber 30 and a conventional tip 31 could then be used at the outermost tip 10 of the die tending to create a substantially flatter final film profile. Alternatively, two or more profiled die inserts can be arranged in series such as shown in FIG. 10, optionally with a flow regulating chamber 30 to attenuate any flow irregularities if desired.

Figure 11:
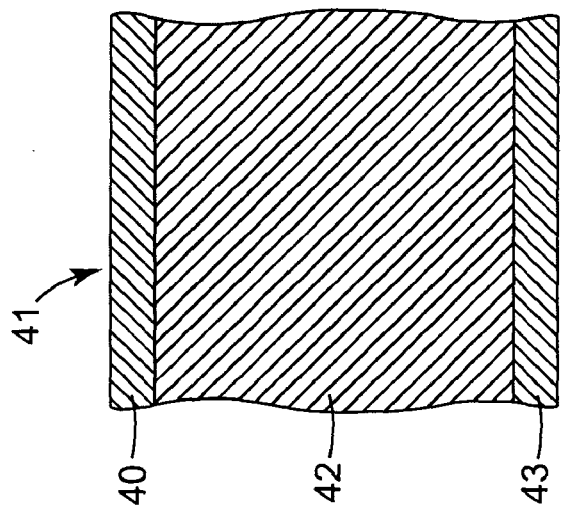
FIG. 11 is a cross-sectional view of a second precursor melt stream, which can be used in accordance with the invention method.

FIG. 11 shows an alternative melt flow stream having layers 40, 42 and 43. As in the first embodiment the outermost layers 40 and 43 are partitioned to the tips 45 and 44 of the die insert inlet elements 47 whereas the main material flow 42 is partitioned mainly in the main flow channel 46 and a portion into the elements 47. At the insert outlet opening 48, the outermost material flow layers 40 and 43 have been redistributed into discrete continuously extending regions 40' and 43' of the outermost surface of the exit material flow with a portion of the center flow layer 42 now forming a portion of the outermost material flow in surface regions 49 and 49'. This results in a film having discrete outermost regions formed both from the central layer material 42 and both outer layers 40 and 43 on opposing surfaces of the extrudate.

Figure 12:
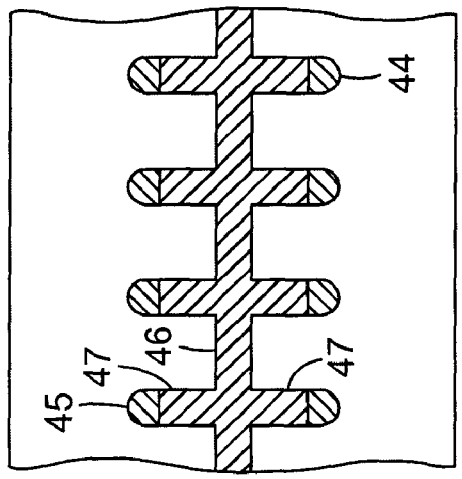
FIG. 12 is a cross-sectional view of the FIG. 11 melt stream at a third embodiment die insert inlet.
Figure 16:
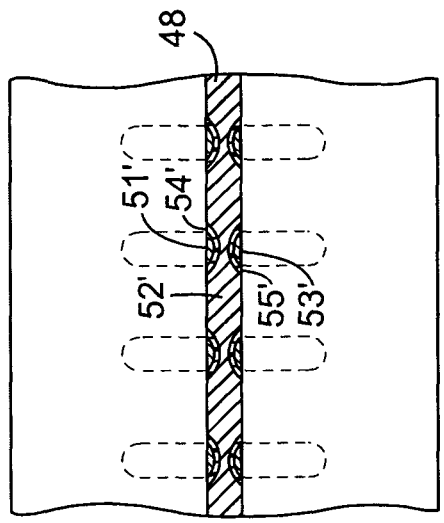
FIG. 16 is cross-sectional view of the FIG. 14 melt stream at the die insert outlet of FIG. 15.
Figure 15:
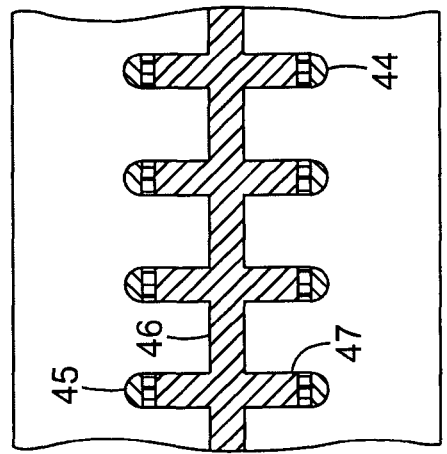
FIG. 15 is a cross-sectional view of the FIG. 14 melt stream at the third embodiment die insert inlet.
Figure 14:
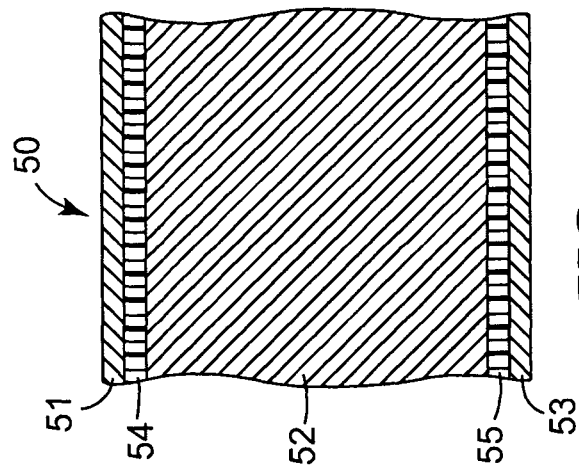
FIG. 14 is a cross-sectional view of a third precursor melt stream, which can be used in accordance with the invention method.

FIG. 14 shows an alternative material melt stream 50 flowing into the identical inlet as shown in FIG. 12. In this case the material melt stream has layers 51, 54, 55 and 53 on the outermost faces of a center layer 52. Based on the relative thicknesses of the layers this can result in the redistribution of the layers into the tips 45 and 44 as shown in FIG. 15 and the resulting redistribution of the material layers 51', 54', 55' 53' and 52' at the insert outlet opening 48 as shown in FIG. 16.

FIG. 17 shows the identical material flow stream 50 as in FIG. 14, which is fed to an alternative insert inlet opening 64 as shown in FIG. 18. The insert inlet opening is formed of a continuous opening 63 with elements 61 and 62 of different heights extending from the continuous opening 63. The top portions 65, 65', 66 and 66' of the elements 61, 61', 62 and 62' have different relative heights. The five respective layers redistribute to these elements in differing ratios depending on the elements 61, 61', 62' and 62 respective heights in relationship to the layer distribution and the layer thicknesses. In the region between peaks 65 and 65', the layers 51, 54, 53 and 55 are substantially completely blocked by closed regions and layers 55 and 54 are redistributed primarily to the top portions 66' and 66 of elements 62, 62'. However, outer layers 51 and 53 can find alternative flowpaths to the top portions 65 and 65' resulting in an extrudate having all five layers 51", 52", 53", 54" and 55", exposed at the outer surfaces of the extrudate. This can result in a layer distribution such as shown in FIG. 18 with a resulting redistribution of the flows at the insert outlet such as shown in FIG. 19. This can result in a film having three discrete regions of different materials on each respective face however the possible combinations are infinite depending on the relative peak height and melt layer thicknesses and number of layers in the melt.

Figure 22:
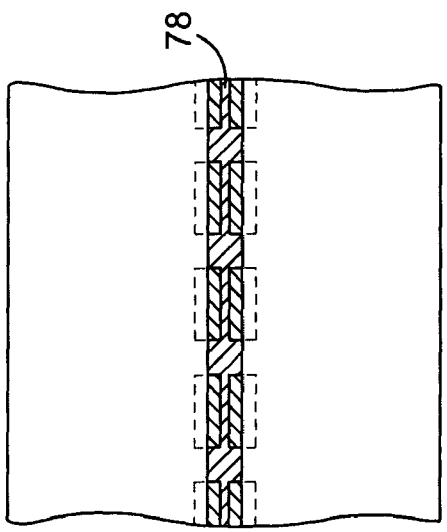
FIG. 22 is cross-sectional view of the FIG. 20 melt stream at the die insert outlet of FIG. 21.
Figure 21:
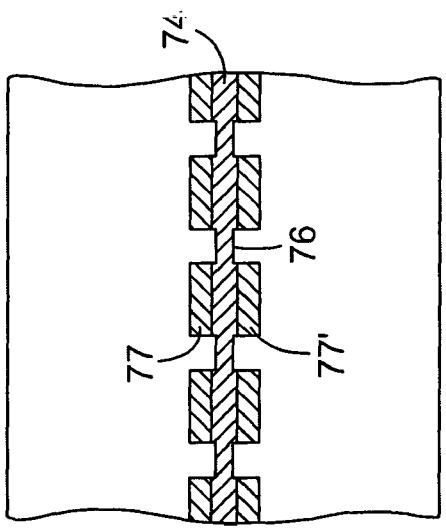
FIG. 21 is a cross-sectional view of the FIG. 20 melt stream a fifth embodiment die insert inlet.
Figure 20:
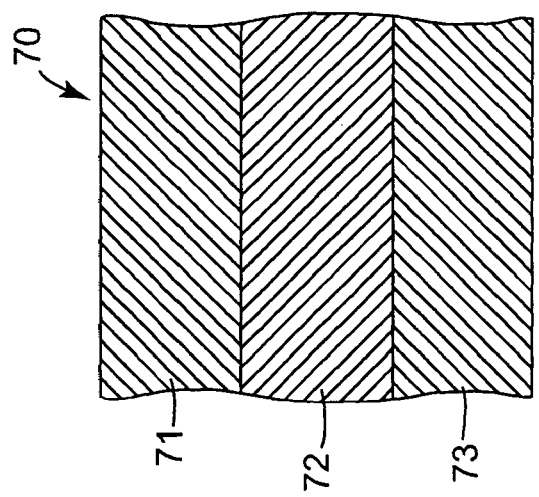
FIG. 20 is a cross-sectional view of a fourth embodiment precursor melt stream which can be used in accordance with the invention method.
Figure 25:
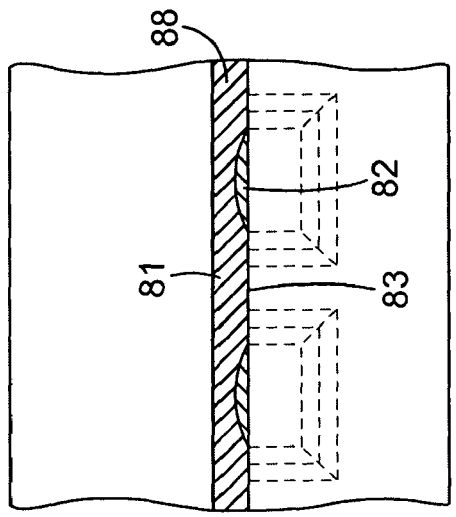
FIG. 25 is cross-sectional view of the FIG. 23 melt stream at the die insert outlet of FIG. 24.

FIG. 20 shows an alternative melt stream 70. The melt flow 70 of FIG. 20 is shown as three relatively equal layers 71 and 72 and 73 in the melt stream 70. This melt stream could be fed to any insert including that shown in FIG. 21, which has an insert inlet 74 having relatively short and wide elements 77, 77' projecting from a main die inlet opening 76. With the FIG. 20 melt stream the outermost layers 71 and 73 distribute to the elements 77 and 77' resulting in a redistribution of the melt stream layers at the insert outlet opening 78 as shown in FIG. 22.

Figure 24:
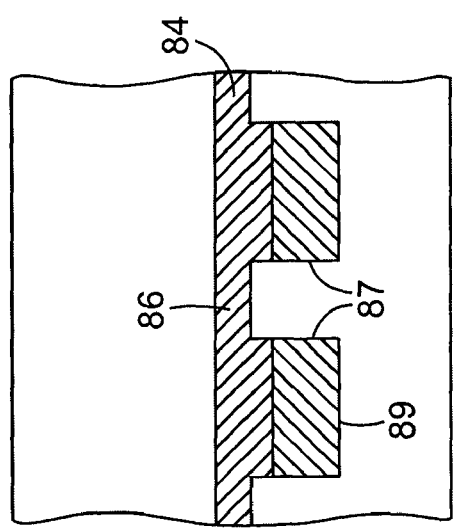
FIG. 24 is a cross-sectional view of the FIG. 23 melt stream at a sixth embodiment die insert inlet.
Figure 23:
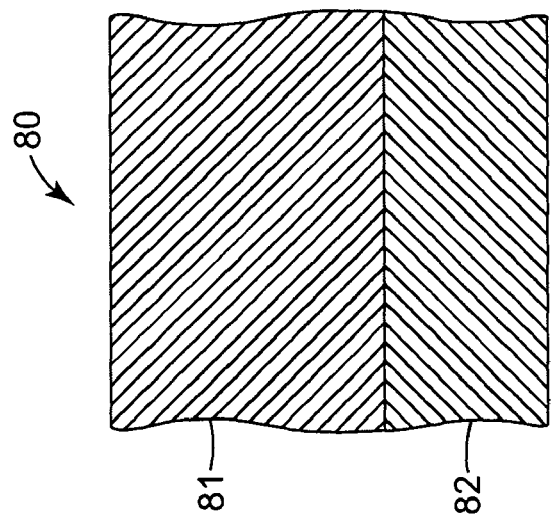
FIG. 23 is a cross-sectional view of a fifth embodiment precursor melt stream which can be used in accordance with the invention method.

FIG. 23 shows a two-layer melt stream 80 formed of layers 81 and 82 which could be fed to another embodiment insert inlet 84 as shown in FIG. 24, where the outer layer 82 redistributes into the die elements 87 partitioning mainly into the element tips 89. The main flow channel 86 contains the majority of the flow from the layer 81. In this embodiment the elements 87 create a flowpath in the insert that tapers continuously in two dimensions toward the insert outlet resulting in higher concentration of the layer 82 in specific regions of the extrudate at the insert outlet opening.

Figure 30:
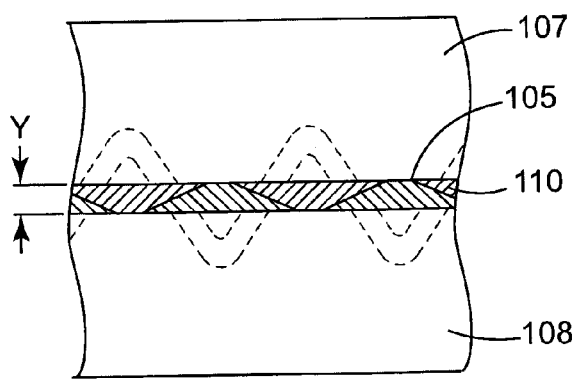
FIG. 30 is a cross-sectional view of the melt stream of FIG. 28 at the die insert outlet of the die insert of FIGS. 26 and 27.

The coextruded melt stream exemplified for the insert of the FIGS. 26-30 embodiment is a two layer material melt stream. A conventional two layer precursor melt stream having an upper and lower zone is fed from the die or feedblock into an insert (having a peak and valley shape) inlet 104 which causes the upper material flow layer 109 to collect in the upper half 107 of the nonplanar insert inlet 104 and the lower material melt layer 108 to collect in the lower half 106 of the nonplanar insert inlet 104. The division of the two material melt streams between the upper and lower halves of the insert would depend on their relative mass flow rates. The upper melt layer 109 could extend into the lower half 106 of the nonplanar insert or the lower melt layer 108 could extend into the upper half 107 of the nonplanar insert. With a two layer melt flow, the upper and lower layers tend to disproportionally partition in a planar manner which results in distinct side-by-side partitioning in the finished flow stream at the insert outlet opening 105 without the need for complex flow diversions in the feedblock or die bodies. The material melt layers have been partitioned along the width-wise extension of the extrudate 110 such that the proportion of the two (or more) materials varies across the extrudates width. In the two layer embodiments, this variation is such that there is a substantially complete partitioning of the materials from substantially 100 percent of the first material layer in a first width-wise zone to substantially 100 percent of the second material layer in a second width-wise zone. With three or more material layers at least one of the material layers, generally will vary in thickness across the transverse direction of the extrudate. A material layer varying in thickness will generally comprise 0-90% of the total extrudate thickness. Each of the layers can comprise from 0-100% of the total thickness of the extrudate at any point across the width (Y-direction) of the extrudate. The material layer varying in thickness will generally vary by at least 10 percent comparing the thickest region to the thinnest region or alternatively, by at least 20 percent or at least 50 percent. The partitioning will be dictated by the relative proportions of the precursor material extrudate layers and the shape of the opening of the insert 100. With an insert having a regularly oscillating opening, the partitioning can result in a film or flowstream as shown in FIG. 30 (assuming a coextruded material melt stream with constant equal ratios of the materials across the melt stream). Where the insert openings vary in either width P, angle "β" amplitude "H", wavelength "W" or any combination thereof, as shown in FIG. 28, the partitioning of the material layers will vary but the flow streams will still partition between the peaks and valleys of the opening of the inserts. The degree of partitioning will also depend on the angle β between legs of the peak and valley openings of the insert. Where the angle β is less than 90 degrees at least one of the layers will tend to be completely partitioned such that it is discontinuously distributed in the extrudate or formed film. This is particularly true where there is an outer flow layer that forms less than 50 percent of the material flow. When the angle β is greater than 90 degrees, the layers tend to partition such that there are no discontinuous layers particularly where a layer is 50 percent or less of the material. Generally the angle β ranges from 170° to 5°, 140° to 10°, 110° to 20°, or 90° to 30°. The peak and valley structures could be regular oscillating curves as shown, step-function curves, or any other variation.

Figure 31:
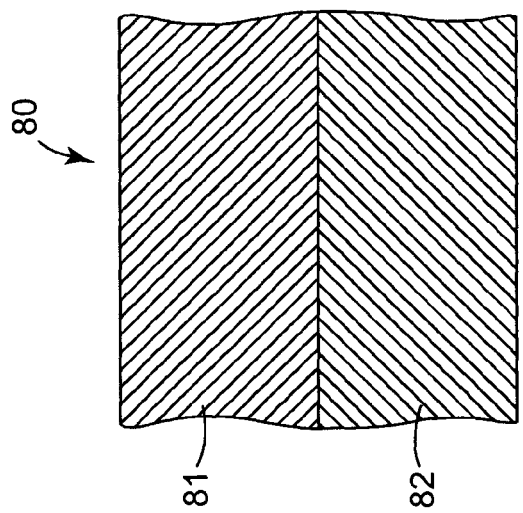
FIG. 31 is a cross-sectional view of a sixth embodiment precursor melt stream which can be used in accordance with the invention method.
Figure 36:
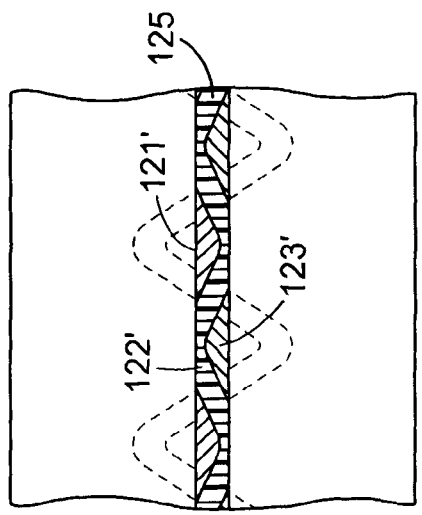
FIG. 36 is a cross-sectional view of the FIG. 34 melt stream at the die insert outlet of FIG. 35.
Figure 35:
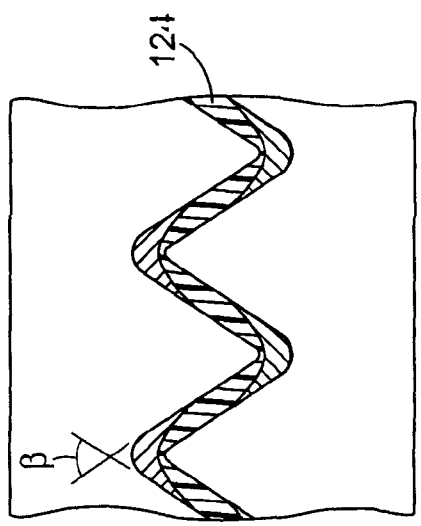
FIG. 35 is a cross-sectional view of the FIG. 34 melt stream at a ninth embodiment die insert inlet.

FIG. 31 shows the two-layered melt stream 80 of FIG. 23 being fed to an oscillating-type insert inlet 114. The division of the two material melt stream layers 81 and 82 does not result in distinct side-by-side partitioning as in the FIGS.

Figure 33:
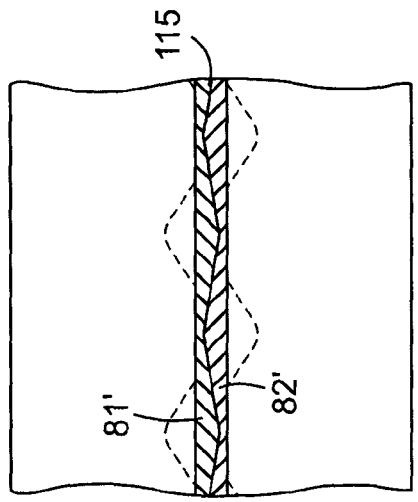
FIG. 33 is a cross-sectional view of the FIG. 31 melt stream at the die insert outlet of FIG. 32.
Figure 32:
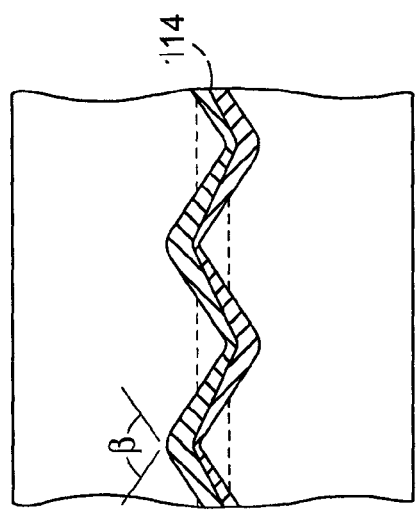
FIG. 32 is a cross-sectional view of the FIG. 31 melt stream at an eighth embodiment die insert inlet.
Figure 34:
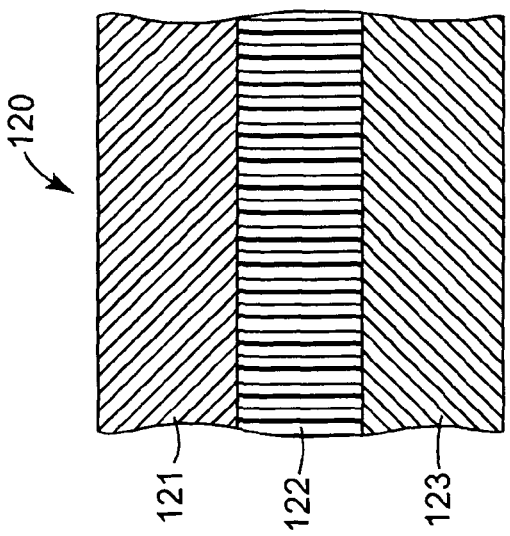
FIG. 34 is a cross-sectional view of a seventh embodiment precursor melt stream which can be used in accordance with the invention method.
Figure 39:
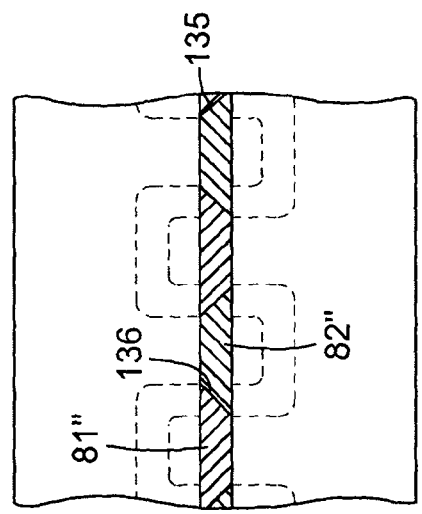
FIG. 39 is a cross-sectional view of the FIG. 37 melt stream at the die insert outlet of FIG. 38.

28-30 embodiment, which is in part due to angle β being greater than 90 degrees however the material layer thickness of both layers varies across the width dimension of the extrudate exiting from the insert outlet 115 shown in FIG. 33. FIG. 34 shows an alternative three-layer melt stream 120 divided into three equal layers 121, 122 and 123 which are fed to an insert inlet 124 where the angle β is slightly less than 90 degrees. This results in substantially complete partitioning of the outer layers 121 and 123 at the die insert outlet 125 resulting in discontinuous material regions 121' and 123'. The center layer 122 is substantially evenly distributed across the width of the film resulting in relatively minimal variations in thickness.

Figure 38:
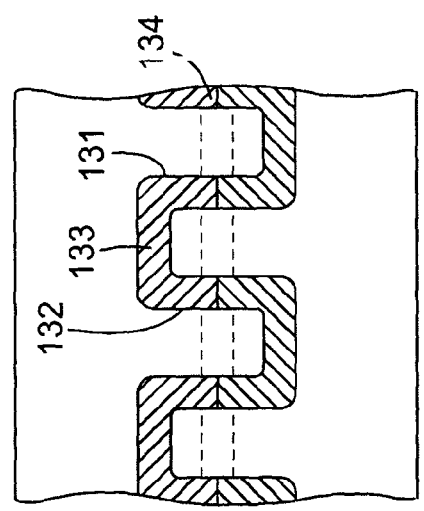
FIG. 38 is a cross-sectional view of the FIG. 37 melt stream at a tenth embodiment die insert inlet.
Figure 37:
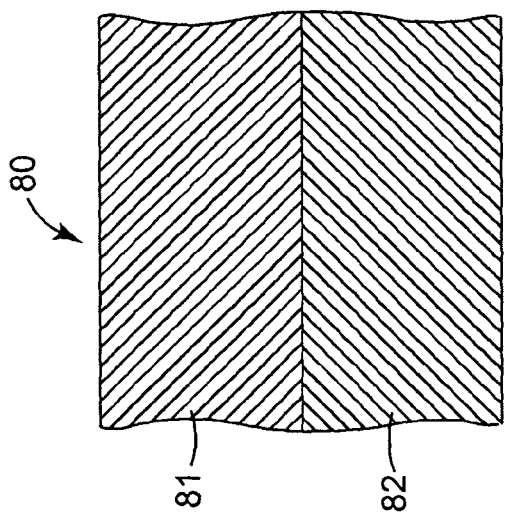
FIG. 37 is a cross-sectional view of a sixth embodiment precursor melt stream which can be used in accordance with the invention method.
Figure 42:
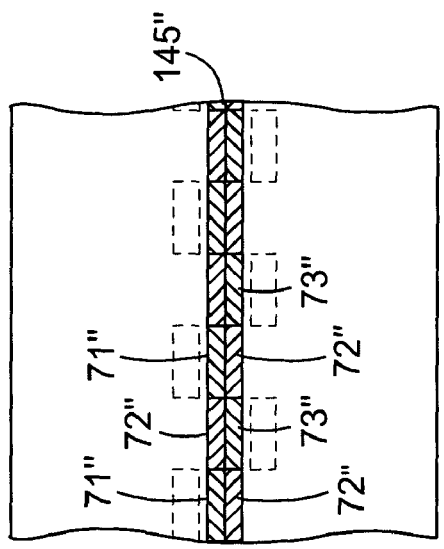
FIG. 42 is a cross-sectional view of the FIG. 40 melt stream at the die insert outlet of FIG. 41.

FIG. 37 again shows the two-layer melt stream 80 of FIG. 23 being fed to an oscillating insert inlet opening 134 shown in FIG. 38. In this case, there is no peak provided in the oscillating structure. As such, the angle β between the legs would be substantially zero whereas the legs 131 and 132 are substantially parallel. The legs 131 and 132 are separated by a plateau region 133. The result is that the insert substantially completely partitions the layers 81 and 82 in the width-wise direction of the extrudate exiting from the insert outlet opening 135 with a rather sharp interface 136 between the partitioned layers 81" and 82". This provides a more dramatic side-by-side redistribution of the formerly coextensive melt layers 81 and 82 than that provided in the FIGS. 28-30 embodiment.

Figure 40:
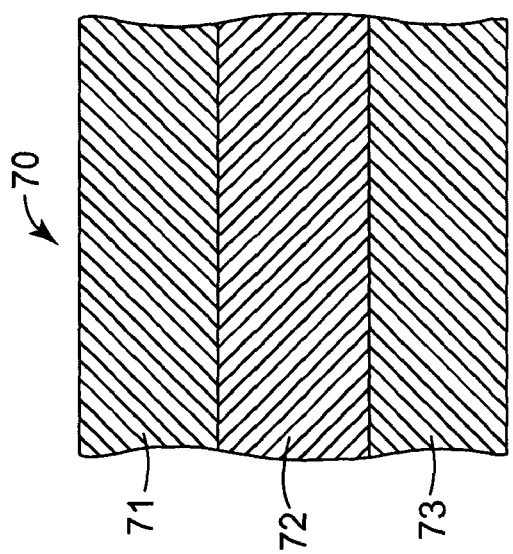
FIG. 40 is a cross-sectional view of a fourth embodiment precursor melt stream which can be used in accordance with the invention method.

FIG. 40 is the melt stream 70 of FIG. 20 having three relatively equal layers 71, 72 and 73 which is fed into an insert inlet opening 144 formed from the discontinuous insert openings 141, 142. The discontinuous insert openings are separated by distance "d". The center melt layer 72 expresses itself on both faces of the extrudate 72" with the outer melt layers 71 and 73 alternatively forming regions 71" and 73" on both outer surfaces with the center layer 72". Insert inlet openings 141 and 142 converge into a common outlet opening 145 forming a substantially continuous extrudate.

Figure 44A:
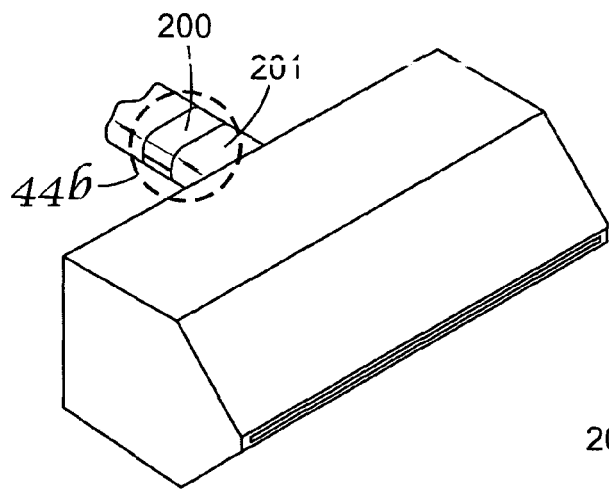
FIG. 44a is a perspective view of a die and feedblock having a feedblock insert such as used in the invention.
Figure 44B:
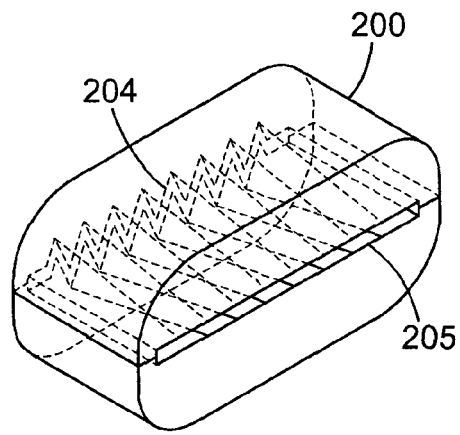
FIG. 44b is a perspective view of a feedblock insert used in accordance with the present invention.

FIGS. 44a and 44b show an insert 200 located in a feedblock tube 201. The insert is substantially the same as that shown in FIG. 26 where the insert inlet 204 feeds to insert outlet opening 205. The dimensions of the flow and the insert are different as the polymer flow in the feedblock is relatively less flat and elongate as compared to the polymer flow in the die.

Suitable polymeric materials from which the coextruded films of the invention can be made include thermoplastic resins comprising polyolefins, e.g., polypropylene and polyethylene, polyvinyl chloride, polystyrene, nylons, polyester such as polyethylene terephthalate and the like and copolymers and blends thereof. Preferably the resin is a polypropylene, polyethylene, polypropylene-polyethylene copolymer or blends thereof.

The multilayer construction can utilize any multilayer or multicomponent film extrusion process such as disclosed in U.S. Pat. Nos. 5,501,675; 5,462,708; 5,354,597 and 5,344,691, the substance of which are substantially incorporated herein by reference. These references teach various forms of multilayer or coextruded elastomeric laminates, with at least one elastic layer and either one or two relatively inelastic layers. A multilayer film, however, could also be formed of two or more elastic layers or two or more inelastic layers, or any combination thereof, utilizing these known multilayer multicomponent coextrusion techniques.

Inelastic layers are preferably formed of semicrystalline or amorphous polymers or blends. Inelastic layers can be polyolefinic, formed predominately of polymers such as polyethylene, polypropylene, polybutylene, or polyethylene-polypropylene copolymer.

Elastomeric materials which can be extruded into film include ABA block copolymers, polyurethanes, polyolefin elastomers, polyurethane elastomers, metallocene polyolefin elastomers, polyamide elastomers, ethylene vinyl acetate elastomers, polyester elastomers, or the like. An ABA block copolymer elastomer generally is one where the A blocks are polyvinyl arene, preferably polystyrene, and the B blocks are conjugated dienes specifically lower alkylene diene. The A block is generally formed predominately of monoalkylene arenes, preferably styrenic moieties and most preferably styrene, having a block molecular weight distribution between 4,000 and 50,000. The B block(s) is generally formed predominately of conjugated dienes, and has an average molecular weight of from between about 5,000 to 500,000, which B block(s) monomers can be further hydrogenated or functionalized. The A and B blocks are conventionally configured in linear, radial or star configuration, among others, where the block copolymer contains at least one A block and one B block, but preferably contains multiple A and/or B blocks, which blocks may be the same or different. A typical block copolymer of this type is a linear ABA block copolymer where the A blocks may be the same or different, or multi-block (block copolymers having more than three blocks) copolymers having predominately A terminal blocks. These multi-block copolymers can also contain a certain proportion of AB diblock copolymer. AB diblock copolymer tends to form a more tacky elastomeric film layer. Other elastomers can be blended with a block copolymer elastomer(s) provided that they do not adversely affect the elastomeric properties of the elastic film material. A blocks can also be formed from alphamethyl styrene, t-butyl styrene and other predominately alkylated styrenes, as well as mixtures and copolymers thereof. The B block can generally be formed from isoprene, 1,3-butadiene or ethylene-butylene monomers, however, preferably is isoprene or 1,3-butadiene.

With all multilayer embodiments, layers could be used to provide specific functional properties in one or both directions of the film such as elasticity, softness, hardness, stiffness, bendability, roughness or the like. The layers can be directed at different locations in the Z direction that are formed of different materials creating a film with cross-direction variation in properties such as described above.

Die Insert Parameters

Various mathematical and geometrical parameters were used to characterize the shape of the openings in the die inserts.

Perimeter Ratio: The ratio of the perimeter of the die insert inlet opening to the perimeter of an equivalent rectangular die insert inlet opening.

Figure 43:
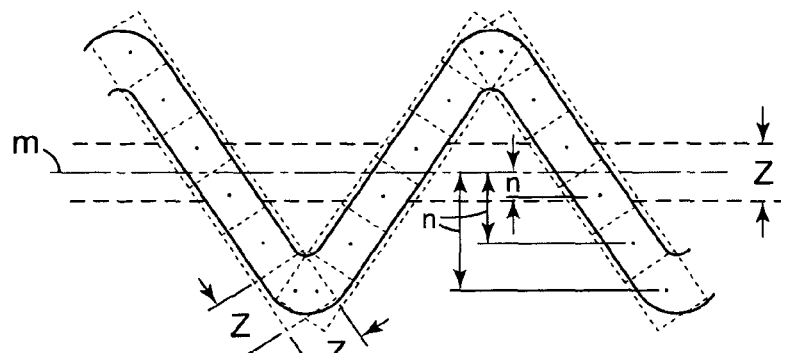
FIG. 43 is a geometric representation of a hypothetical die insert used for calculation of the Flow Path Deviation Factor.

Flow Path Deviation Factor: A measure of how much the material flow path deviates from a hypothetical linear flow path. This is calculated by overlaying a trace of the inlet opening shape on top of a hypothetical rectangular outlet opening shape as generally depicted in FIG. 43, where Z is the largest width dimension P of the inlet opening. The height or gap of the outlet opening is 'Z'. To mathematically approximate the area of the inlet opening, a series of squares having sides equal to 'Z' are fitted to the inlet opening. A reference line 'm' is drawn corresponding to the center of the hypothetical outlet opening. For each square that has been fitted to the inlet opening (both above and below reference line 'm'), the distance from the center of the square to the reference line 'm' is calculated and is shown as 'n', where n is expressed in units of Z. The individual squares are multiplied by the distance n that the center of the square is from the reference line and normalized for the actual area of the inlet (which is generally equal to or less than Z square) occupying the square. All these values are then summed for all squares fitted to the inlet opening and then divided by the total number of squares (including those whose distance 'n' is zero) to arrive at the Flow Path Deviation Factor.

EXAMPLE 1

A coextruded profiled web was made using conventional apparatus except three extruders were used to produce a 3 layer structure consisting of a first 'A' blue layer, a second 'B' red layer and a third 'C' red layer. The 'B' and 'C' red layers act as one layer because they are of the same material. The first layer was produced with a polypropylene/polyethylene impact copolymer (99% 7523, 4.0 MFI, Basell Polyolefins Company, Hoofddorp, Netherlands) and 1% blue polypropylene-based color concentrate. The second and third layers were produced with 98% 7523 polypropylene/polyethylene impact copolymer and 2% red polypropylene-based color concentrate. A 6.35 cm single screw extruder was used to supply 7523 copolymer for the first layer, a 3.81 cm single screw extruder was used to supply 7523 copolymer for the second layer and a 2.54 cm single screw extruder was used to supply 7523 copolymer for the third layer. The barrel temperature profiles of all three extruders were approximately the same from a feed zone of 215° C. gradually increasing to 238° C. at the end of the barrels. The flow rates of the extruders were adjusted to maintain a 50:50 weight ratio between the blue layer and the two red layers combined. The melt streams of the three extruders were fed to an ABC three layer coextrusion feedback (Cloeren Co., Orange, Tex.). The feedblock was mounted onto a 20 cm die equipped with a profiled die insert similar to that shown in FIGS. 26 and 27. The feedblock and die were maintained at 238° C. The die insert was machined such that β angle between the segments was 53 degrees. After being shaped by the die insert, the extrudate was quenched and drawn through a water tank and around an idler roll at a speed of 6.1 meter/min with the water being maintained at approximately 45° C. The web was air dried and collected into a roll. The resulting web was relatively flat with a distribution of layers similar to that shown in FIG. 30. The red (B & C) layers are depicted as 1 layer in FIG. 30 because the material forming the two layers is identical and thus acts as 1 layer in this embodiment. The basis weight, thickness, and other structural parameters of the web are reported in Table 1 below.

EXAMPLE 2

A coextruded profiled web was made as in Example 1 except the blue 'A' layer was produced using a styrene-isoprene-styrene block copolymer (KRATON 1114, Kraton Polymers Inc., Houston, Tex.). Partitioning of the layers resulted in a web similar to that shown in FIG. 30 having elastic properties in the transverse direction and inelastic properties in the machine direction. The basis weight, thickness, and other structural parameters of the web are reported in Table 1 below.

EXAMPLE 3

Figure 13:
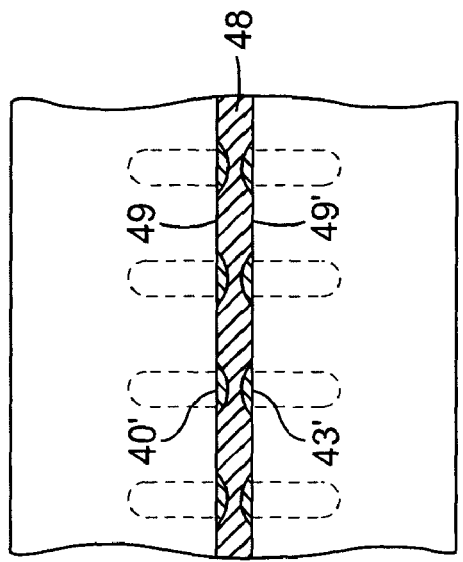
FIG. 13 is cross-sectional view of the FIG. 11 melt stream at the die insert outlet of FIG. 12.

A coextruded profiled web was made as in Example 1 except the 'A' and 'C' layers were produced using 99% 7523 copolymer and 1% blue color concentrate, and the 'B' layer was produced using 99% 7523 copolymer and 1% white color concentrate. A die insert similar to that shown in FIGS. 2 and 3 was used to shape the extrudate. Partitioning of the layers resulted in a web similar to that shown in FIG. 13. The basis weight, thickness and other structural parameters of the web are reported in Table 1 below. The flow rates of the extruders were adjusted to reduce the overall basis weight by about 50 percent.

EXAMPLE 4

A coextruded profiled web was made as in Example 1 except the white 'B' layer was produced using a styrene-isoprene-styrene block copolymer (KRATON 1114, Kraton Polymers Inc., Houston, Tex.). Partitioning of the layers resulted in a web similar to that shown in FIG. 13. The basis weight, thickness, and other structural parameters of the web are reported in Table 1 below.

EXAMPLE 5

Figure 44C:
FIG. 44c is a cross-sectional view of the melt stream at the feedblock insert outlet of FIG. 44b.

A coextruded profiled web was made as in Example 1 except the profiled insert was positioned in the feed pipe before the die inlet as shown in FIG. 44*a*. A profiled insert, 1.25 cm thick and 7.5 cm wide, was used similar to that shown in FIG. 44*b*. An 'AB' two-layer coextruded web was produced using an 'ABC' feedblock (Cloeren Co., Orange, Tex.) and a 6.35 cm extruder (10 RPM) feeding the 'A' channel and a 3.81 cm extruder (40 RPM) feeding the 'B' channel with the 'C' channel not being fed. The 'A' layer was produced with a polypropylene (99% 3762, 18 MFI, Total Petrochemicals USA Corp.) and 1% red polypropylene-based color concentrate. The 'B' layer was produced with 99% 3762 polypropylene and 1% white polypropylene-based color concentrate. The barrel temperature profiles of the two extruders were approximately the same from a feed zone temperature of 215° C. gradually increasing to 238° C. at the end of the barrels. The feedblock and die were maintained at 238° C. The extrudate was extruded through a 20 cm wide flat film coat hanger die and then quenched and drawn through a water tank and around an idler roll at a speed of 6.25 meter/min with the water being maintained at approximately 45° C. The web was air dried and collected into a roll. The resulting web was relatively flat with a cross-sectional distribution of layers similar to that shown in FIG. 44*c*. The basis weight, thickness, and other structural parameters of the web are reported in Table 1 below.

TABLE 1

| | Example 1 | Example 2 | Example 3 | Example 4 | Example 5 |
|---|---|---|---|---|---|
| Basis Weight (grams/meter$^2$) | 254 | 287 | 130 | 236 | — |
| Thickness - T (microns) | 290 | 370 | 270 | 310 | 200 |
| Thickness - P (microns) | 200 | 200 | 200 | 200 | 1250 |
| Angle β (degrees) | 67 | 67 | — | — | 53 |
| Wavelength - W (microns) | 1250 | 1250 | 1250 | 1250 | 10160 |
| Opening Height - H (microns) | 1200 | 1200 | 1950 | 1950 | 12700 |
| Element Height - h (microns) | — | — | 875 | 875 | — |
| h/H × 100 | — | — | 44.9 | 44.9 | — |
| Flow Path Dev. Factor | 1.4 | 1.4 | 1.7 | 1.7 | 2.1 |

TABLE 1-continued

|  | Example 1 | Example 2 | Example 3 | Example 4 | Example 5 |
|---|---|---|---|---|---|
| Perimeter Ratio | 1.62 | 1.62 | 1.59 | 1.59 | 2.1 |
| Total Insert Face Area (mm$^2$) | 27.1 | 27.1 | 18.7 | 18.7 | 968 |
| Inlet Opening Area (mm$^2$) | 7.1 | 7.1 | 9.0 | 9.0 | 190 |
| Inlet Closed Area (mm$^2$) | 20.0 | 20.0 | 9.7 | 9.7 | 778 |
| Closed Area % of Total Area | 73 | 73 | 52 | 52 | 80 |

We claim:

1. A method for forming an extruded article comprising:
   (a) extruding an initial melt stream along a flowpath in a die or feedblock;
   (b) providing an insert having a front face and an opposing back face, an inlet opening in the front face, and an outlet opening in the opposing back face, the inlet opening being non-rectilinear and extending a distance between an inlet opening upper boundary to an inlet opening lower boundary, the inlet opening being surrounded by closed areas of the front face above the inlet opening upper boundary, below the inlet opening lower boundary, and in a region between the inlet opening upper boundary and the inlet opening lower boundary, and the outlet opening extending a distance between an outlet opening upper boundary to an outlet opening lower boundary;
   (c) extruding the initial melt stream into the insert inlet opening such that, along at least a portion of the flowpath at the insert front face, the closed areas in the region between the inlet opening upper boundary and the inlet opening lower boundary interrupt at least a portion of the initial melt stream causing a redistribution of at least a portion of the initial melt stream; and
   (d) converging the redistributed melt stream within flow channels extending from the inlet opening to the outlet opening of the insert, wherein the distance between the inlet opening upper boundary and inlet opening lower boundary is larger than the distance between the outlet opening upper boundary and the outlet opening lower boundary, wherein at the insert outlet opening, the redistributed and converged melt stream comprises side-by-side regions that differ in properties or material due to the redistribution of the initial melt stream at the insert front face.

2. The method of claim 1 wherein the melt stream flowpath and the insert are located within a die.

3. The method of claim 2 wherein the melt stream flowpath and the insert are located at the die outlet.

4. The method of claim 1 wherein the melt stream flowpath and the insert are located within a feedblock.

5. The method of claim 3 wherein the redistributed and converged melt stream at the insert outlet is an extruded polymeric article.

6. The method of claim 2 wherein the redistributed and converged melt stream at the insert outlet is extruded into a further flowpath within the die.

7. The method of claim 1 wherein the initial melt stream is a multicomponent melt stream of two or more regions of different components.

8. The method of claim 7 wherein the initial melt stream is a multilayer melt stream.

9. The method of claim 7 wherein the initial melt stream is a multilayer melt stream wherein the different components are different polymeric materials or blends.

10. The method of claim 2 wherein the melt stream flowpath at the insert front face is substantially linear.

11. The method of claim 10 wherein the melt stream flowpath at the insert front face is substantially straight.

12. The method of claim 10 wherein the melt stream flowpath at the insert front face is a substantially curved line.

13. The method of claim 12 wherein the melt stream flowpath at the insert front face is substantially circular.

14. The method of claim 1 wherein the region between the inlet opening upper boundary and the inlet opening lower boundary includes open areas forming the inlet opening and the closed areas, and wherein the closed areas redirect the interrupted melt stream portions to the open areas.

15. The method of claim 14 wherein the open areas constitute from 10 to 90 percent of the area of the region between the upper boundary and the lower boundary in at least some portion of the region.

16. The method of claim 15 wherein the open areas constitute from 20 to 80 percent of the area of the region between the upper boundary and the lower boundary in at least some portion of the region.

17. The method of claim 14 wherein the closed areas constitute greater than 10 percent of the area of the region between the upper boundary and the lower boundary in at least some portion of the region.

18. The method of claim 17 wherein the closed areas constitute greater than 20 percent of the area of the region between the upper boundary and the lower boundary in at least some portion of the region.

19. The method of claim 17 wherein the closed areas constitute greater than 30 percent of the area of the region between the upper boundary and the lower boundary in at least some portion of the region.

20. The method of claim 17 wherein the closed areas constitute greater than 50 percent of the area of the region between the upper boundary and the lower boundary in at least some portion of the region.

21. The method of claim 14 wherein the inlet opening has a perimeter ratio to an equivalent rectangular opening in at least a portion of the inlet opening of between 1.1 and 10.

22. The method of claim 21 wherein the perimeter ratio in at least a portion of the inlet opening is between 1.1 and 2.3.

23. The method of claim 14 wherein the inlet opening has a perimeter ratio to an equivalent rectangular opening in at least a portion of the inlet opening of at least 1.1.

24. The method of claim 23 wherein the perimeter ratio in at least a portion of the inlet opening is at least 1.5.

25. The method of claim 23 wherein the perimeter ratio in at least a portion of the inlet opening is at least 2.3.

26. The method of claim 14 wherein the inlet opening has a perimeter ratio to an equivalent rectangular opening in at least a portion of the inlet opening of less than 8.

27. The method of claim 26 wherein the perimeter ratio in at least a portion of the inlet opening is less than 5.

28. The method of claim 14 wherein the inlet opening has opening elements extending between the upper boundary and the lower boundary having a height "h" which is less than or equal to the distance "H" between the upper boundary and the lower boundary.

29. The method of claim 28 wherein the height "h" of the opening elements is from 10 to 100 percent of "H".

30. The method of claim 28 wherein the height "h" of the opening elements is from 20 to 90 percent of "H".

31. The method of claim 28 wherein at least some of the opening elements extend at an angle of from 2 to 90 degrees from a mean flowpath between the upper boundary and the lower boundary.

32. The method of claim 28 wherein at least some of the opening elements extend at an angle of from 5 to 80 degrees from a mean flowpath between the upper boundary and the lower boundary.

33. The method of claim 28 wherein at least some of the opening elements extend at an angle of from 10 to 90 degrees from a mean flowpath between the upper boundary and the lower boundary.

34. The method of claim 28 wherein the opening elements have an aspect ratio of height "h" to Height "H" of greater than 10 percent.

35. The method of claim 28 wherein the opening elements have an aspect ratio of height "h" to Height "H" of greater than 25 percent.

36. The method of claim 14 wherein the insert tapers substantially continuously from the insert inlet opening to the insert outlet opening over at least some portion of the insert.

37. The method of claim 14 wherein the outlet opening comprises open areas, and wherein the open areas of the inlet opening are greater than the open areas of the outlet opening.

38. The method of claim 37 wherein the ratio of the inlet opening open areas to outlet opening open areas is from 0.9 to 10.

39. The method of claim 37 wherein the ratio of the inlet opening open areas to outlet opening open areas is from 1 to 5.

40. The method of claim 1 wherein the inlet opening is substantially continuous.

41. The method of claim 1 wherein the inlet opening is discontinuous.

42. The method of claim 1 wherein at least a portion of the inlet opening has a Flow Deviation Factor of at least 0.2.

43. The method of claim 1 wherein at least a portion of the inlet opening has a Flow Deviation Factor of at least 0.5.

44. The method of claim 42 wherein at least a portion of the inlet opening has a Flow Deviation Factor of less than 2.

45. The method of claim 42 wherein at least a portion of the inlet opening has a Flow Deviation Factor of less than 3.

46. The method of claim 1 wherein at least a portion of the outlet opening has a Flow Deviation Factor at least 50 percent less than the corresponding inlet opening.

47. The method of claim 43 wherein at least a portion of the outlet opening has a Flow Deviation Factor at least 80 percent less than the corresponding inlet opening.

48. The method according to claim 1, wherein the side-by-side regions of the redistributed and converged melt stream have different levels of melt flow induced orientation in at least a layer of the redistributed and converged melt stream.

49. The method according to claim 1, wherein the side-by-side regions of the redistributed and converged melt stream comprise different polymers.

50. The method according to claim 1, wherein the side-by-side regions of the redistributed and converged melt stream comprises different relative proportions of polymers.

51. The method according to claim 1, wherein the front face and the opposing back face of the insert are parallel.

\* \* \* \* \*